United States Patent
Guyomarc'h et al.

(10) Patent No.: US 10,951,611 B1
(45) Date of Patent: Mar. 16, 2021

(54) GRAPHICAL CONFIGURATION OF SIGNAL STRENGTH RANGE

(71) Applicant: Assa Abloy AB, Stockholm (SE)

(72) Inventors: François-Eric Michel Guyomarc'h, Clermont l'Herault (FR); Christophe Cauquelin, Suresnes (FR); Pol-Herve Tandeo, Neuilly (FR)

(73) Assignee: ASSA ABLOY AB, Stockholm (SE)

( * ) Notice: Subject to any disclaimer, the term of this patent is extended or adjusted under 35 U.S.C. 154(b) by 261 days.

(21) Appl. No.: 16/102,128

(22) Filed: Aug. 13, 2018

Related U.S. Application Data (60) Provisional application No. 62/545,300, filed on Aug. 14, 2017.

(51) Int. Cl.
*H04L 29/06* (2006.01)
*G01S 5/02* (2010.01)
(Continued)

(52) U.S. Cl.
CPC ........ *H04L 63/0853* (2013.01); *G01S 5/0252* (2013.01); *G06T 11/206* (2013.01); *H04B 17/318* (2015.01); *H04W 12/06* (2013.01); *H04W 12/08* (2013.01); *H04W 64/003* (2013.01); *H04W 4/80* (2018.02)

(58) Field of Classification Search
CPC . H04L 63/0853; H04L 63/107; H04B 17/318; G01S 5/0252; G06T 11/206; H04W 12/06; H04W 12/08; H04W 64/003; H04W 4/80
See application file for complete search history.

(56) References Cited

U.S. PATENT DOCUMENTS

| | | | |
|---|---|---|---|
| 2011/0037712 A1* | 2/2011 | Kim | H04M 1/72583 345/173 |
| 2014/0181510 A1* | 6/2014 | Kita | G06F 21/31 713/165 |

(Continued)

OTHER PUBLICATIONS

P. Hu, P. H. Pathak, Y. Shen, H. Jin and P. Mohapatra, "PCASA: Proximity Based Continuous and Secure Authentication of Personal Devices," 2017 14th Annual IEEE International Conference on Sensing, Communication, and Networking (SECON), San Diego, CA, 2017, pp. 1-9, doi: 10.1109/SAHCN.2017.7964941 (Year: 2017).*

*Primary Examiner* — Kristine L Kincaid
*Assistant Examiner* — Alexander R Lapian
(74) *Attorney, Agent, or Firm* — Schwegman Lundberg & Woessner, P.A.

(57) ABSTRACT

A GUI to configure user access to a secure device. For signals received by a secure device from a user device, the GUI enables a user to intuitively configure a range of signal strength of such signals required to allow user devices access to the secure device or an application residing thereon. The GUI may present a distance range icon that visually presents a range of signal strength as a distance, each point along the length corresponding to a signal strength value. The GUI may include a control for controlling the distance range icon, and may present a user device icon for a user device currently within the signal reception range of the secure device. The user device icon may be presented in spatial relation to the distance range icon, thereby visually informing a user of the relative distance of the user device from the secure device.

19 Claims, 7 Drawing Sheets

(51) Int. Cl.
*H04B 17/318* (2015.01)
*G06T 11/20* (2006.01)
*H04W 12/06* (2021.01)
*H04W 12/08* (2021.01)
*H04W 64/00* (2009.01)
*H04W 4/80* (2018.01)

(56) References Cited

U.S. PATENT DOCUMENTS

| | | | |
|---|---|---|---|
| 2015/0355308 A1* | 12/2015 | Ishida | G01S 5/12 455/456.1 |
| 2018/0069932 A1* | 3/2018 | Tiwari | H04L 67/16 |
| 2020/0007209 A1* | 1/2020 | Kang | G01S 3/14 |

\* cited by examiner

GRAPHICAL CONFIGURATION OF SIGNAL STRENGTH RANGE

CROSS-REFERENCE TO RELATED APPLICATIONS

This application claims priority to U.S. Prov. App. No. 62/545,300, filed on Aug. 14, 2017, and entitled "VISUAL CONFIGURATION OF RADIO SIGNAL STRENGTH", which is incorporated herein by reference in its entirety.

BACKGROUND OF THE INVENTION

1. Technical Field

This application is related to the field of device security, and more particularly to graphically configuring a wireless signal strength range for controlling access to a device.

2. Description of Related Art

A mobile device may be used as a container of credentials to allow a user to login to, or unlock, a personal computer (PC) or other device. For example, the latest generation of Microsoft Windows PC includes a new framework called the Hello Framework (Companion Device Framework), which allows unlocking a PC using any of a variety of types of devices (a mobile device, a smart card, etc.). Communications between a PC and a mobile device often rely on contactless technology like Bluetooth Low Energy (LE). A PC and/or mobile device may periodically emit signals that enable other devices to detect their presence, which may be referred to herein as detection signals.

It is desirable to tune the strength of the radio detection signal so that a PC automatically unlocks when the mobile device containing the credentials is close so that a user carrying the mobile device causes the PC to automatically unlock when the user approaches the PC to operate it. However, it may not be secure if the detection distance is too far since this may cause the PC to unlock before the user is in front of it (e.g., in the same room). On the other hand, setting the distance to be too close could be inconvenient since it may require the user to remove the mobile device from his pocket to place the mobile device in close proximity to the PC. Note also that the tuning may be dependent on various factors such as the PC environment (other devices in vicinity, parasite signals, etc.), the characteristic of the Bluetooth stack and also the mobile device used, thus further complicating the distance adjustment.

Accordingly, it is desirable to provide a mechanism that facilitates adjusting the strength of a radio detection signal so that the PC unlocks only when the mobile device is an appropriate distance from the PC.

SUMMARY OF THE INVENTION

According to the system described herein, controlling user access to a first device includes displaying on a screen a distance range icon indicative of a range of distance from the first device, the range corresponding to a range of signal strength, for one or more second devices, displaying a device icon on the screen at a position relative to the distance range icon indicative of an estimated current distance of the second device from the first device, receiving a user input indicative of a change to the range of distance corresponding to a change in the range of signal strength, adjusting the distance range icon based on the user input, and controlling access of devices to the first device based on the range of signal strength. Controlling user access to a first device may also include displaying on the screen a slider control for the distance range icon, wherein user input indicative of the change to the range of distance is made using the slider control. The range of signal strength may be indicative of a range of signal strength of a signal received at the first device from another device for which to allow the other device to log-in to the first device or an application on the first device. Controlling user access to a first device may also include detecting a signal transmitted from the second device and displaying a value indicative of a strength of the detected signal, wherein the display position of the second device relative to the distance range icon is determined from the strength of the detected signal. Controlling user access to a first device may also include, for each of a plurality of signal strength values in the range of signal strength, determining, for one or more types of devices, a distance from the type of device that corresponds to the signal strength value, wherein at least one of the one or more second devices is one of the device types for which a distance is determined and, for the at least one of the one or more second devices, determining an estimated current distance of the at least one second device from the first device based on the determined distance of the device type of the at least one second device. Controlling user access to a first device may also include receiving a user input indicating movement of the device icon of one of the one or more second devices, in response to the user input indicating movement of the device icon, moving the device icon of the one second device, and, in response to the user input indicating movement of the device icon, adjusting a strength at which a signal is transmitted from the one second device. Controlling user access to a first device may also include detecting a plurality of devices transmitting signals for which a signal strength is within the signal strength range, displaying a control listing the plurality of detected device, and, in response to a user input, selecting the one or more second devices from the list.

According further to the system described herein, controlling user access to a first device includes providing a display on a screen that presents a dynamic correlation between a strength of a signal being received at the first device from a second device and a distance of the second device from the first device, receiving user input indicative of a desired range of signal strength of a signal received at the first device from another device for which to allow the other device to log-in to the first device or an application on the first device, defining a signal strength range based on the user input, detecting, at the first device, a first signal from a third device, determining whether a first signal strength of the first signal is within the defined signal strength range, based at least in part on the determination, determining whether to log-in a user of the third device to at least one of: the first device, and an application on the first device. It may be determined that the first signal strength is within the defined signal strength range and controlling user access to a first device may also include determining whether the first signal strength is greater than a second signal strength of a second signal recently detected at the first device from the third device prior to detection of the first signal and determining whether to log-in the user to the at least one of: the first device, and the application based at least in part on whether the first signal strength is greater than the second signal strength. Controlling user access to a first device may also include detecting, at the first device, a second signal from the third device, determining whether a second signal strength of the second signal is outside the defined signal strength range, and based at least in part on determining whether a second signal strength of the second signal is outside the defined signal strength range, determining whether to log-out the user from at least one of: the first device, and the application. It may be determined that the second signal strength is outside the defined signal strength range and controlling user access to a first device may also include determining whether the second signal strength is greater than a third signal strength of a third signal recently detected at the first device from the third device prior to detection of the second signal and determining whether to log-out the user to the at least one of: the first device, and the application based at least in part on whether the second signal strength is greater than the third signal strength. The display may include a distance range icon indicative of a range of distance from the first device, the range corresponding to a range of signal strength and controlling user access to a first device may also include, for one or more other devices, displaying a device icon on the screen at a position relative to the distance range icon indicative of an estimated current distance of the other device from the first device, wherein the user input includes an indication of a change to the range of distance corresponding to a change in the range of signal strength. The display may further include a slider control for the distance range icon, and the user input indicative of the change to the range of distance may be made using the slider control.

According further to the system described herein, a system for managing access control to a first device includes a display screen and at least one processor coupled to a memory, the memory storing processor executable instructions that configure the at least one processor to display on a screen a distance range icon indicative of a range of distance from the first device, the range corresponding to a range of signal strength, for one or more second devices, display a device icon on the screen at a position relative to the distance range icon indicative of an estimated current distance of the second device from the first device, receive a user input indicative of a change to the range of distance corresponding to a change in the range of signal strength, and adjust the distance range icon based on the user input, wherein access of devices to the first device is controlled based on the range of signal strength. User input indicative of the change to the range of the distance may be made using a slider control displayed on the display screen. The range of signal strength may be indicative of a range of signal strength of a signal received at the first device from another device for which to allow the other device to log-in to the first device or an application on the first device. A display position of the second device relative to the distance range icon may be determined according to a strength of a detected signal from the second device. The memory storing processor executable instructions may configure the at least one processor to additionally, for each of a plurality of signal strength values in the range of signal strength, determine, for one or more types of devices, a distance from the type of device that corresponds to the signal strength value, wherein at least one of the one or more second devices is one of the device types for which a distance is determined, and, for the at least one of the one or more second devices, determine an estimated current distance of the at least one second device from the first device based on the determined distance of the device type of the at least one second device. The memory storing processor executable instructions may configure the at least one processor to additionally receive a user input indicating movement of the device icon of one of the one or more second devices, in response to the user input indicating movement of the device icon, move the device icon of the one second device, and, in response to the user input indicating movement of the device icon, adjust a strength at which a signal is transmitted from the one second device. The memory storing processor executable instructions may configure the at least one processor to additionally detect a plurality of devices transmitting signals for which a signal strength is within the signal strength range, display a control listing the plurality of detected device. and, in response to a user input, select the one or more second devices from the list.

In some embodiments, one or more computer-readable media, for example, non-transitory computer-readable media, are provided having software stored thereon including executable code that performs the above-described method.

BRIEF DESCRIPTION OF DRAWINGS

Embodiments of the system are described with reference to the several figures of the drawings, noted as follows.

DETAILED DESCRIPTION OF VARIOUS EMBODIMENTS

It may be desirable to tune the strength of a detection signal of a mobile device, card or user device (other device) so that a PC or other device unlocks (or can be unlocked) when a mobile device, card or other device is close, but not too close or too far. This tuning may depend on various factors including, but not limited to: the PC environment (other devices in vicinity, parasite signals, etc.), the characteristic of a radio technology (e.g., Bluetooth stack) and also the mobile device used. It further may be desirable that such tuning be done in an intuitive, user-friendly manner.

Described herein is a system for using a graphical user interface (GUI) to configure user access to a device, often referred to herein a "secure device." A secure device may be any of a variety of types such as, for example, a computer (server, laptop, etc.), card reader, door reader, other types of devices, or any suitable combination of the foregoing. For signals received by a secure device from user devices desiring access to the secure device, the system defined herein enables a GUI user to configure a range of signal strength (e.g., received signal strength indication (RSSI)) of such signals required to allow user devices access to the secure device or an application residing thereon. Any of a variety of wireless technologies may be used in various embodiments of the system described herein such as, for example, Wifi, Wifi Direct, Bluetooth, Bluetooth LE, Near Field Communication, other wireless technologies, or any suitable combination of the foregoing.

In some embodiments, configuring a range of signal strength includes defining a minimum signal strength for which to allow user devices access to the secure device or an application residing thereon. For example, the user device may not be allowed to login to the device or application thereon unless the strength of a signal detected by the secure device from the user device is within the configured range. Conversely, the user device may be logged out of the secure device when the user device moves outside of the signal strength range. A user device may be any of a variety of types such as, for example, a mobile phone (e.g., smart phone), laptop, tablet, personal digital assistant, other types of mobile devices, smart cards, tokens (e.g., BlueTrust token) other types of devices, or any suitable combination of the foregoing.

The GUI may present an icon (e.g., an illustration) that visually presents a range of signal strength as a distance (i.e., a length), each point along the length corresponding to a signal strength value. Such an icon may be referred to herein as a "distance range icon." For example, the distance range icon may illustrate a series of graphic radio wave lines, the series of lines collectively having a certain length. The GUI may include a control (e.g., a slide bar) for controlling the distance range icon, e.g., for controlling a length of the series of radio wave lines, which in turn controls the signal strength range of the secure device. The control may enable a user to define a minimum signal strength that must be detected from a user device to allow the user device to access the secure device or an application thereon.

The GUI also may present icons for each of one or more user devices currently within the signal reception range of the secure device (while not necessarily in the configured signal strength range of the secure device). The user device icons may be presented in spatial relation to the distance range icon, thereby visually informing a user of the relative distance of the user device from the secure device. Further, because the distances illustrated by the distance range icon correspond to signal strength values, the position of a user device icon within the GUI visually informs the user of a relative signal strength being received by the secure device from the use device.

The GUI also may display a signal strength value (e.g., a number) for each user device within the signal reception range of the secure device, indicative of the actual signal strength being detected by the secure device from the user device. This signal strength value may be expressed, for example, in decibel-milliwatts (dBm), milliwatts or watts. A user viewing the GUI can visually correlate actual distance to signal strength by observing (or even measuring) the actual distance of the user device to the secure device, and comparing this actual distance to the actual detected signal strength being displayed on the GUI. The GUI user also can visually correlate the displayed actual signal strength and/or the observed actual distance to the relative distance depicted by the position of the user device icon with respect to the distance range icon.

Multiple user device icons may be displayed concurrently on the GUI, each icon representing a user device within the signal reception range of the secure device (and selected by a user in some embodiments). The GUI also may include separate distance range controls (e.g., sliders) for each user device icon or multiple user device icons may share a same distance range control, as described in more detail elsewhere herein.

In some embodiments, a correlation between distance and a strength of a signal received by a secure device from a user device may be preconfigured for one or more user device types, e.g., prior to live use in controlling access to the secure device by user devices of the user device types. For example, one or more devices of a device type (e.g., iPhone, iPad, Samsung Galaxy, Google Nexus, LG Tribute, Amazon Fire, Lenovo Tab4, etc.) may be moved, in turn, relative to a secure device or a device of a type to be used as a secure device. As a user device of the device type moves, the strength of a signal (e.g., detection signal) received by the secure device is detected and the distance between the secure device and user device measured using any of a variety of known techniques, e.g., GPS, optically or by electronic signal analysis. Thus, for a plurality of signal strength values, a corresponding distance value may be recorded. This process may be repeated many times using the same device and/or other user devices of the device type and/or secure devices of the secure device type, and average distance values recorded. These distance values may be stored is a database accessible by users of a secure devices or other personnel involved in controlling access to secure devices. The recorded values may serve as default values for a particular type of user device. Thus, when a signal is initially detected by a secure device from a user device, the type of the user device may be determined from the signal, and the distance values corresponding to the device type applied.

In some embodiments, the GUI may be configured to allow a GUI user to override default values of distance for a user device. For example, based on the user's own observations of distances between the user device and the secure device and the viewed signal strength and distance information on the GUI, the GUI user may decide to manually override one or more distance values, and the GUI may be configured to allow the GUI user to enter the override values (e.g., by keyboard, mouse, touchscreen, voice, etc.).

Based on the signal strength and/or distance information displayed for a user device, a user may desire to increase or decrease a signal strength being transmitted by the user device. In some embodiments, the GUI may include a control to enable the user to modify the strength of a signal transmitted from a user device. For example, in some embodiments, the user device icon may serve as such a control, in which a user can select and move (e.g., click-on and drag) the user device to indicate a desired increase or decrease of transmission signal strength. In response, the secure device may transmit an instruction to the user device to increase or decrease transmission signal strength of the user device. In response to the changed transmission strength, the strength of the signal received by the secure device may change, and the signal strength and distance information displayed by the GUI may be adjusted accordingly.

A GUI according to various embodiments of the system described herein may be resident on, and/or include a display on a screen of, the secure device itself or another device remotely located from the secure device, for example, a user device itself or another device, which may be referred to herein as a management device, which may be any type of device capable of communicating with the secure device. In embodiments in which the GUI is being operated remotely from the secure device, the device (management device and/or user device) may have to be logged into, or have unlocked, the secure device before being allowed to use the GUI.

The configured signal strength range may be used to control access of a user to a secure device. For example, a secure device may detect a signal transmitted from the user device, identify the type of the device (or identify the device itself if previously identified and recorded) and determine whether the strength of the signal is within the signal strength range of the device type (or user device itself if previously recorded). The secure device also may determine whether the user device is already logged-in and whether the strength of the detected signal is greater than or less than the detected strength of a most recent signal detected from user device, which may be indicative of whether the user device is moving towards or away from the secure device. Based on the foregoing determinations, it may be determined whether to log in or log out the user device from the secure device, as described in more detail elsewhere herein.

In some embodiments, a GUI may be configured to limit the value a user can define as a minimum signal strength threshold (i.e., the lower boundary of the signal strength range) to a minimum and/or maximum value, as is described in more detail elsewhere herein. Such a maximum limit may prevent a user from defining a minimum signal strength threshold so high that a user device may need to exhaust its batteries to maintain access to a secure device, and a minimum limit may prevent allowing user access from too far of a distance.

Visually presenting both the signal strength range and the signal strength of a current signal received from a device as a distance provides a user-friendly, dynamic and intuitive way for a user to configure a signal strength range, rather than blindly updating settings through trial and error without the benefit of the visually conveyed information. A GUI user can move a user device to various distances from a secure device, observe the actual change in distance between the user device and secure device, view the change in signal strength and information displayed by the GUI, and adjust the signal strength range accordingly, e.g., using the distance range control. A GUI user may dynamically and intuitively tune the signal strength range such that the required signal strength is relatively low, which may increase a battery life of a user device. A GUI user also may dynamically and intuitively tune the signal strength range such that the required signal strength is relatively high, which would generally require that a user device be closer to the secure device to access (e.g., by logging into or unlocking) the secure device, thereby increasing a security of the secure device.

In some embodiments, a user interface described herein, and techniques related thereto, may be used to determine how the location of a user device (not just distance) with respect to a secure device may affect signal strength. For example, card readers and/or contactless card readers (as secured devices) may be attached on a PC in a number of locations. However, the location of the reader can affect perceived signal strength of the smart card (as the user device). Various aspects of the system described herein may help users understand the effect the card location has on signal strength and help the users identify a proper location of a smartcard reader on the PC (or other device).

Illustrative embodiments of the system will now be described in more detail in relation to the figures.

Figure 1:
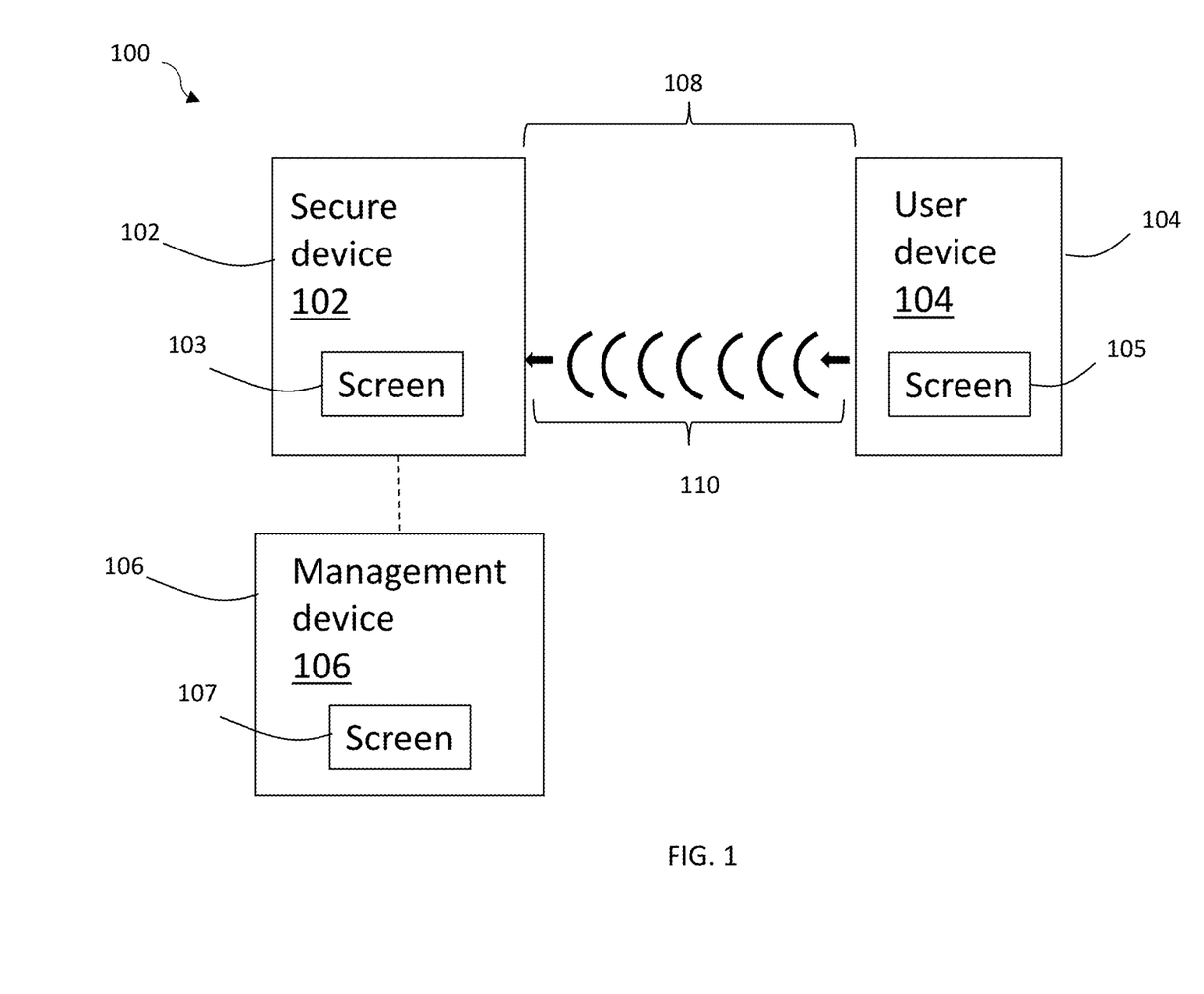
FIG. 1 is a block diagram illustrating a graphical configuration system according to embodiments of the system described herein.

FIG. 1 is a block diagram illustrating a graphical configuration system 100 according to embodiments of the system described herein. A secure device 102 may be configured to enable user devices to be logged-in only within a certain range of signal strength for a signal received from a user device. For example, a user device 104 may be, at any given point in time, a distance 108 from the secure device 102, and the secure device 102 may receive a signal 110 (e.g., a detection signal) transmitted by the user device 104 at the distance 108, and the signal 110 may have a detected strength at the secure device 102.

A GUI according to various embodiments of the system described herein may be configured to enable a user to define a signal strength range such that the user device 104 can be logged-in to the secure device 102 if the strength of the signal 110 detected at the secure device 102 is within the configured signal strength range. The GUI may present a display on any of the screens 103, 105 or 107 of the secure device 102, the user device 104 or the management device 106, respectively, the display includes signal strength and/or distance information relative to one or more user devices (e.g., the user device 104) that enable a user to intuitively define a signal strength range. Each of the secure device 102, the user device 104 and the management device 106 may be any of a variety of types of devices as described elsewhere herein.

Figure 2:
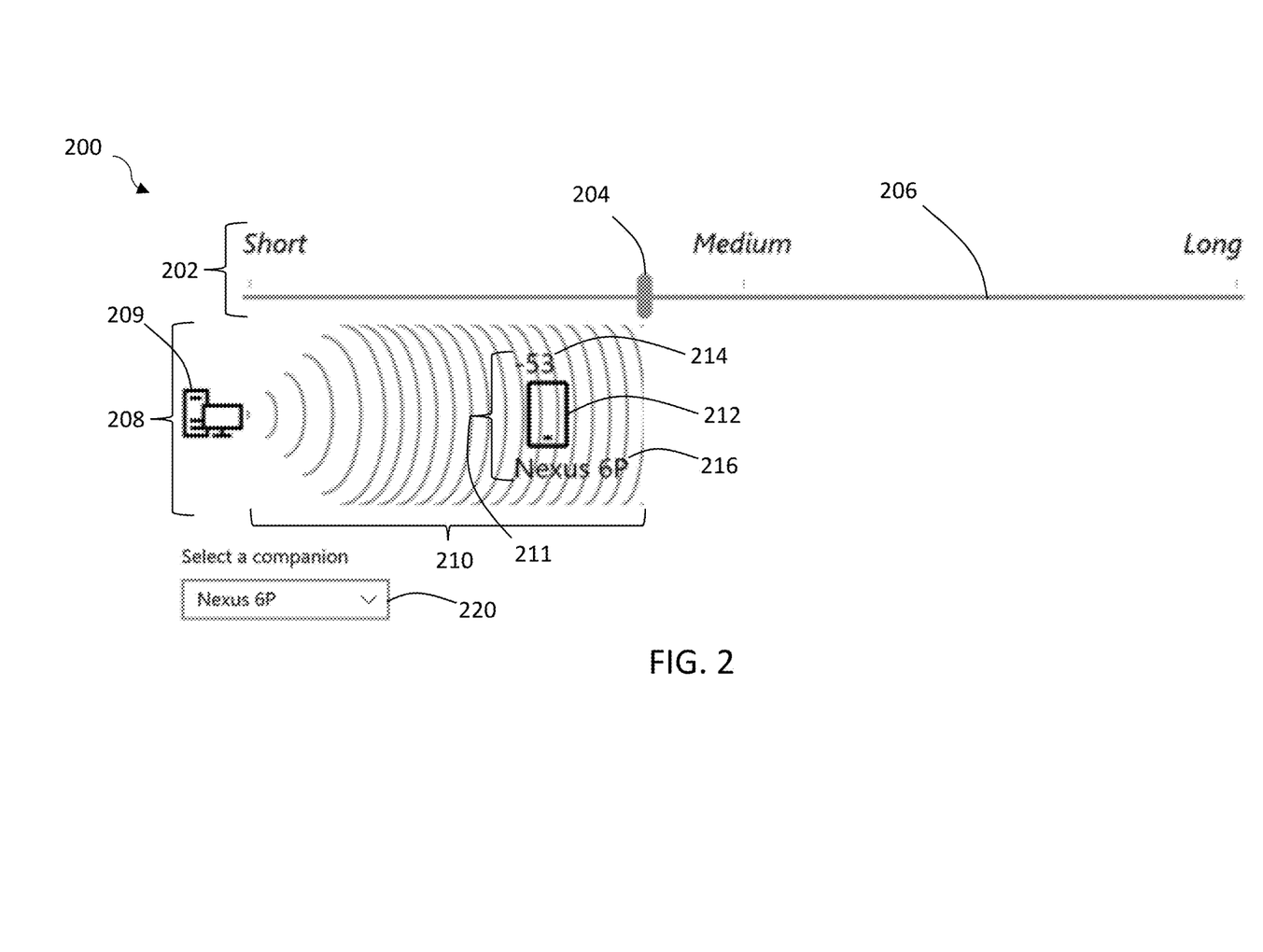
FIG. 2 illustrates an example of a user interface display for configuring a signal strength range, according to embodiments of the system described herein.

FIG. 2 illustrates a user interface display 200, for example, a GUI display, for configuring a signal strength range, according to embodiments of the system described herein. The display may include a device selection control 220, a strength and distance information area 208, and a distance range icon control 202. The device selection control 220 may be, for example, a drop-down menu and may list any user devices for which the secure device is currently detecting signals. A user may select one or more of the listed devices to display the strength and distance information area 208.

The area 208 may include a distance range icon 210, which may, for example, illustrate a series of radio wave lines, the series of lines collectively having a certain length. The width of the distance range icon 210, e.g., the collective length series of radio wave lines, may represent a distance range from a secure device (e.g., the secure device 209), the distance range corresponding to a signal strength range. In some embodiments, the distance range icon 210 may include numerical values indicative of distance (e.g., in meters), for example, at certain location along a horizontal edge of the icon 210.

The area 208 also may include a secure device icon 209, and one or more user device display areas 211 for each user device for which the secure device is currently detecting a signal (e.g., a detection signal) that has been selected by the user using the user device selection control 220. It should be appreciated that, in some embodiments, a user device icon may be displayed for all user devices for which the secure device is currently detecting a signal, and no selection control 220 may be provided. A user device display area 211 may include a user device icon 212, a user device signal strength indication 214 and a user device identifier 216.

The user device identifier 216 identifies the user device from which the signal was detected by the secure device, which may have been determined from identifying information within the detected signal. The signal strength indication 214 may display a signal strength value (e.g., a number) for the represented user device, the value indicative of the actual signal strength being detected by the secure device from the user device. This signal strength value may be expressed, for example, in decibel-milliwatts (dBm), milliwatts or watts. To accommodate for frequent fluctuations in signal strength due to environmental changes, the signal strength value presented to the user may be a value that represents running average signal strength; i.e., an average signal strength value of the last "x" detected signal strength values for the user device. For example, an average signal strength value of the signals received over a most recent period of time (e.g., 2 seconds) may be determined. For example, a device may emit ten detection signals values per second, such that, for two seconds, an average may represent an average of twenty detected signal strength values. It should be appreciated, however, that environment interfaces may result in a detection signal that is "lost" between devices (e.g., never reaches a secure device from a user device). Thus, in some embodiments, the signal strength value may be an average determined from a last N detection signals actually received, as opposed to whatever number is received over a period of time. Average signal strength values may be computed using both methods, and the user interface 200 may present an option to a user, enabling the user to select whichever method they prefer to use for the signal strength value. In some embodiments, a suitable combination of both averages may be presented as an option and selected by the user.

As described in more detail elsewhere herein, different device types may exhibit different signal strength characteristics. Further, the frequency of detection signal transmission and lost detection signals may vary by device type, and thus different average strength calculation durations and/or number of detections may be used for different device types to calculate signal strength averages. In some embodiments, the user interface 200 may be configured to allow a user to select different calculation types for different types of devices. Thus, the signal strength value for a first user device being represented in the user interface 200 may be calculated using a different technique than the signal strength value for a second user device being represented in the user interface 200.

Each user device icon 211 may be presented in spatial relation to the distance range icon 210, thereby visually informing a GUI user of the relative distance of the represented user device from the secure device represented by the secure device icon 209. The distance reflected by the position of the user device icon 211 relative to the distance range icon 210 may be an estimated distance, based on the actual detected signal strength indicated by signal strength indication 214. This estimated distance may be based on distances previously determined for signal strength values detected by devices of the same device type as the user device being represented. That is, as described in more detail elsewhere herein, in some embodiments a correlation between strength of a signal received by a secure device from a user device and distance may be preconfigured for one or more user device types, e.g., prior to live use in controlling access to the secure device by user devices of the user device types.

Figure 3:
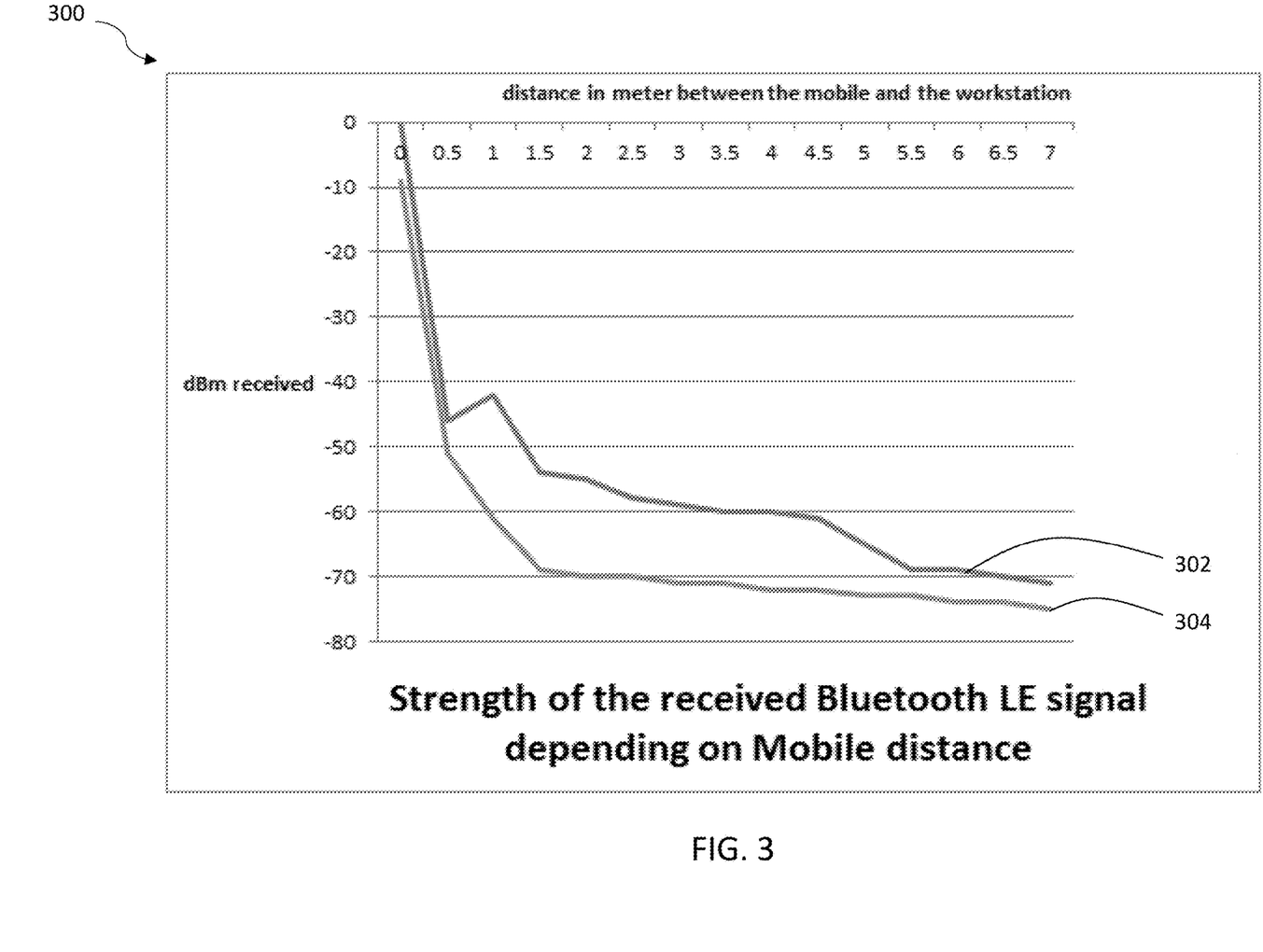
FIG. 3 is a chart illustrating a measured relationship between signal strength and distance for two device types according to embodiments of the system described herein.

FIG. 3 is a chart 300 illustrating measured relationships between signal strength and distance for two device types. In the chart 300, the x-axis represents distance in meters, and the y-axis represents signal strength in dBm. Thus, the curve 302 represents signal strength per distance for a first type of device (e.g., an iPhone 6) and the curve 304 represents signal strength per distance for a second type of device (e.g., a Galaxy S6). The values reflected in the chart 300 may be recorded in a database and serve as default values of distance as a function of signal strength for the measured device types. The default values may be used to determine an estimated distance of a user device from a secure device based on a detected signal strength value, and the estimated distance may be used to determine a position of a secure device icon 209 relative to the distance range icon 210 based on the actual detected signal strength value indicated by the signal strength indicator 214. As can be seen from the chart 300, different device types may have different signal strength profiles. Failing to accommodate the differences in estimating distance values for signal strength values may lead to a confusing display.

Returning to FIG. 2, because the distances within the range illustrated by the distance range icon 210 correspond to signal strength values, the position of the user device icon 211 within the GUI display 200 may visually inform the GUI user of a relative signal strength being received by the secure device from the use device. A user viewing the GUI display 200 may visually correlate actual distance to signal strength by observing (or even measuring) the actual distance of the user device to the secure device, and comparing this actual distance to the actual detected signal strength being displayed on the GUI. The GUI user also can visually correlate the displayed actual signal strength indicated by the signal strength indication 214 and/or the observed actual distance to the relative distance depicted by the position of the user device icon 211 with respect to the distance range icon 210. In some embodiments, the estimated distance of the user device may be displayed in numerical form (e.g., in meters) within the area 211.

A user of the user interface 100 can get a feel for the signal strength of a user device being represented in the area 211 per distance from a secure device by moving the user device relative to the secure device, and observing the change of user device information displayed in the area 211, including the change of the signal strength value 214 and a change in position of the user device icon 212 relative to distance range icon 210. The icon 212 may move to the right as the user device moves farther away from the secure device and the signal strength value may go down (albeit not necessarily linearly). Conversely, the icon 212 may move to the left as the user device moves closer to the secure device and the signal strength value may go up (albeit not necessarily linearly).

The distance range icon control 202 may control the distance range displayed by the distance range icon 210. The distance range represented by the distance range icon may be a translation of a signal strength range, i.e., each value in the distance range maps to a signal strength value. Thus, the distance range icon 202 may be in essence a signal strength range control, since the distance range icon 202 controls the signal strength range. As illustrated in FIG. 2, the distance range icon control 202 may include a track 206 and include a set position marker 204 that can be slid along the track 206. The set position marker 204 may be vertically aligned with a right side of the distance range icon 210, which may enable a user to intuitively define a minimum estimated distance corresponding the right edge of the distance range icon 210. The minimum estimated distance corresponds to a minimum signal strength threshold, which represents a lower boundary of the signal strength range. Thus, by sliding the marker 204 left or right, a user may increase or decrease, respectively, the minimum signal strength required to access a secure device; e.g., to log-in or unlock it. That is, sliding the marker 204 to the left results in a stronger signal strength being required to have access, and sliding the marker 202 to the right results in a user device being able to have access with lower detected signal strength, e.g., from a greater distance.

Thus, for a given user device, the combination of the distance range icon 210 and the user device information in the area 211 enables a user to graphically and dynamically see simultaneously and adjust: 1) the signal strength/distance range they are willing accept, and 2) the signal strength/estimated distance of the user device.

Figure 4:
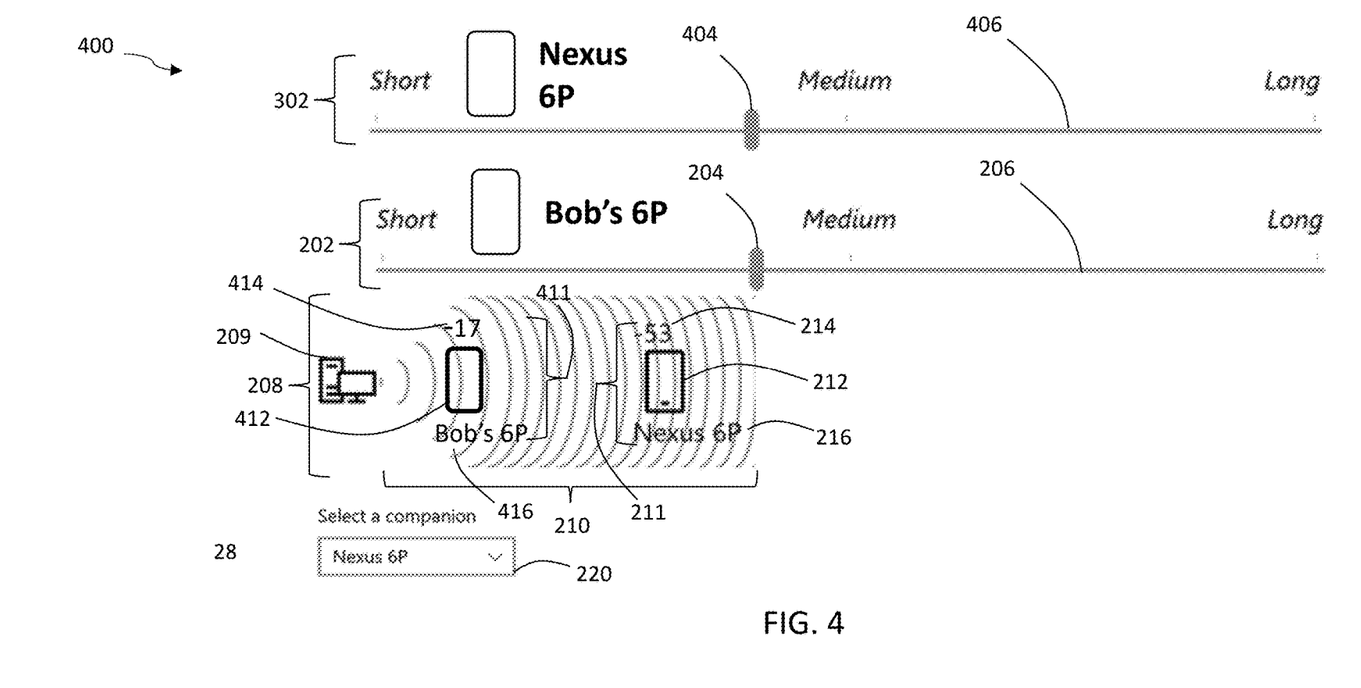
FIG. 4 illustrates a different embodiment of a user interface display for configuring a signal strength range, according to embodiments of the system described herein.

FIG. 4 illustrates another example of a user interface display 400 for configuring a signal strength range, according to embodiments of the system described herein, in which multiple user devices have information being displayed. The display of information for two devices may result from both devices being selected from user device selection control 220. In the illustrative example of FIG. 4, for a second user device ("Bob's 6P"), a second user device icon 412, a second signal strength value 414 and a second user device ID 416 are displayed in user device signal strength and distance area 211. In some embodiments, only a single distance range control (e.g., the control 202) may be provided to control the distance range control 302. In other embodiments, a separate distance range control 302 is provided for the second device, in which case a separate distance range icon may be displayed for each user device, each distance range icon controlled by a different control. Alternatively, color coding (or another visual indicator) may be used such that, upon selection of one of the distance range controls, the distance range icon controlled by the selected distance range control becomes a color corresponding the distance range control, and thus the color correspond to the user device corresponding the control as well. The color coding or other visual scheme may be used consistently throughout the interface 400 to distinguish information and controls corresponding to different user devices. When more than one distance range control is provided, an ID of the user device corresponding to the control may appear proximate to the control to inform the user of the user device to which the control belongs.

It should be appreciated that in some embodiments of the system described herein, different signal strength ranges and/or maximum and minimum limits (described in more detail elsewhere herein) may be defined for different device types, or even different individual user devices, using the user interface 400.

It should also be appreciated that two (or more) user devices displayed in the user interface 500 may be of different device type, and, if the user devices are of different device type, the relationship between detected signal strength and distance from the secure device may be different, for example, as illustrated by the chart 300. Such a difference may be reflected in information presented in the area 211 for each user device.

In some embodiments, rather than a linear horizontal distance range icon 210, the user interface 400 may have a radial radar-like icon, with a quadrant (or the like) for each user device displayed, with a center of the icon representing a position of a secure device, and a distance of a user device from the secure device being depicted by a distance of a user device icon from a center of the radial icon.

Figure 5:
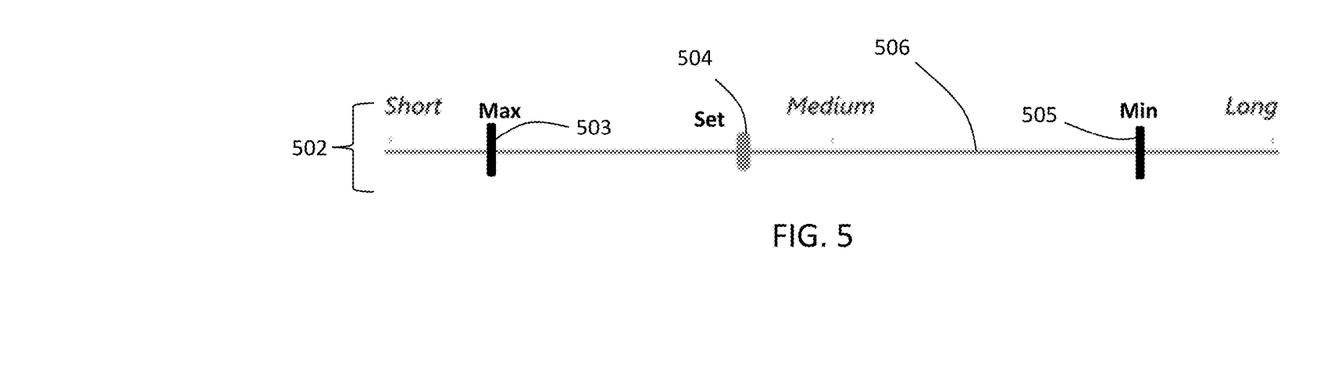
FIG. 5 illustrates an example of a slide bar control, according to embodiments of the system described herein.

FIG. 5 illustrates a slide bar control 502, according to embodiments of the system described herein. A maximum limit marker 503 and minimum limit marker 505 are shown on the slide bar control 502. The maximum limit marker 503 may define a maximum limit (maximum amount of device power allowed to be required for detection) to the value a user can define as the minimum signal strength threshold (i.e., the lower boundary of the signal strength range), and the minimum limit marker 505 may define a minimum limit (minimum amount of device power allowed to be required for detection) to the value a user can define as the minimum signal strength threshold. The maximum limit may prevent a user from defining a minimum signal strength threshold so high that a user device may need to exhaust its batteries to maintain access to a secure device, and the minimum limit may prevent allowing user access from too far of a distance. For example, referring to the chart 300 of FIG. 3, it can be seen that, for some device types, as the distance between a secure device and the user device becomes relatively great, the signal strength begins to flatten out. Thus, it may be desirable to define a minimum limit higher than a value corresponding to a distance at which the signal strength flattens out to avoid the risk of allowing access at too great a distance, thereby potentially reducing security of the secure device. The control 502 may be configured to not enable a user to slide the set position marker 504 beyond the maximum limit marker 503 and/or the minimum limit marker 505.

Figure 6:
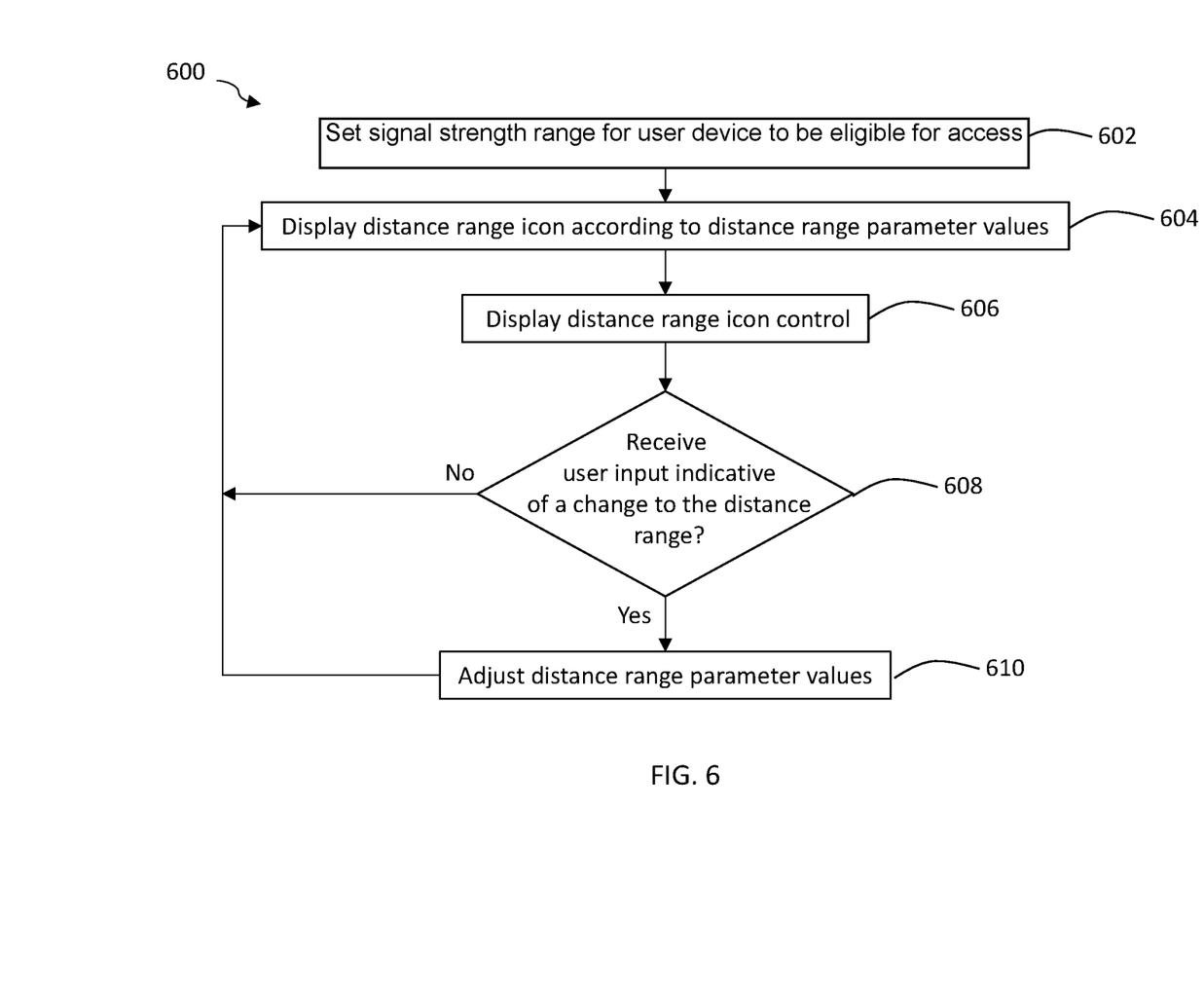
FIG. 6 is a flowchart illustrating graphically configuring a signal strength range, according to embodiments of the system described herein.

FIG. 6 is a flowchart 600 illustrating graphically configuring a signal strength range, according to embodiments of the system described herein. In a step 602, a signal strength range for a user device to be eligible for access to a secure device, for example, for a user device to be logged into or unlock the secure device, may be set. For example, the signal strength range may be set based on previous measurements taken for a device type of the user device, as described in more detail elsewhere herein.

In a step 604, a distance range icon (e.g., the distance range icon 210) may be displayed according to distance range parameter values; and in a step 606, a distance range icon control (e.g., the distance range icon control 202) may be displayed concurrently to the display of the distance range icon 210.

In a step 608, it may be determined whether a user input indicative of a change to the distance range has been received. Such user input may be received as described in more detail elsewhere herein. If it is determined that such a user input was received, then, in a step 610, an appropriate distance range parameters may be adjusted in accordance with the user input, as described in more detail elsewhere herein; and the method may return to the step 604, in which the distance range icon may be displayed in accordance with the adjusted distance range parameters. If it is determined in the step 608 that user input was not received, then the method may return to the step 604 and the display range icon may continue to be displayed according to unchanged distance range parameter values.

It should be appreciated that two or more steps of the flowchart 600 may be performed in a different order than illustrated and/or concurrently, at least in part. Further, the flowchart 600 presents an illustrative example in which steps are performed sequentially for illustrative purposes, but it should be appreciated that one or more steps may be performed in response to asynchronous acts, e.g., events. For example, at any point during the display of a distance range icon, user input may be received that changes one or more parameters affecting the display, and the display of the distance range icon may be adjusted accordingly.

Figure 7:
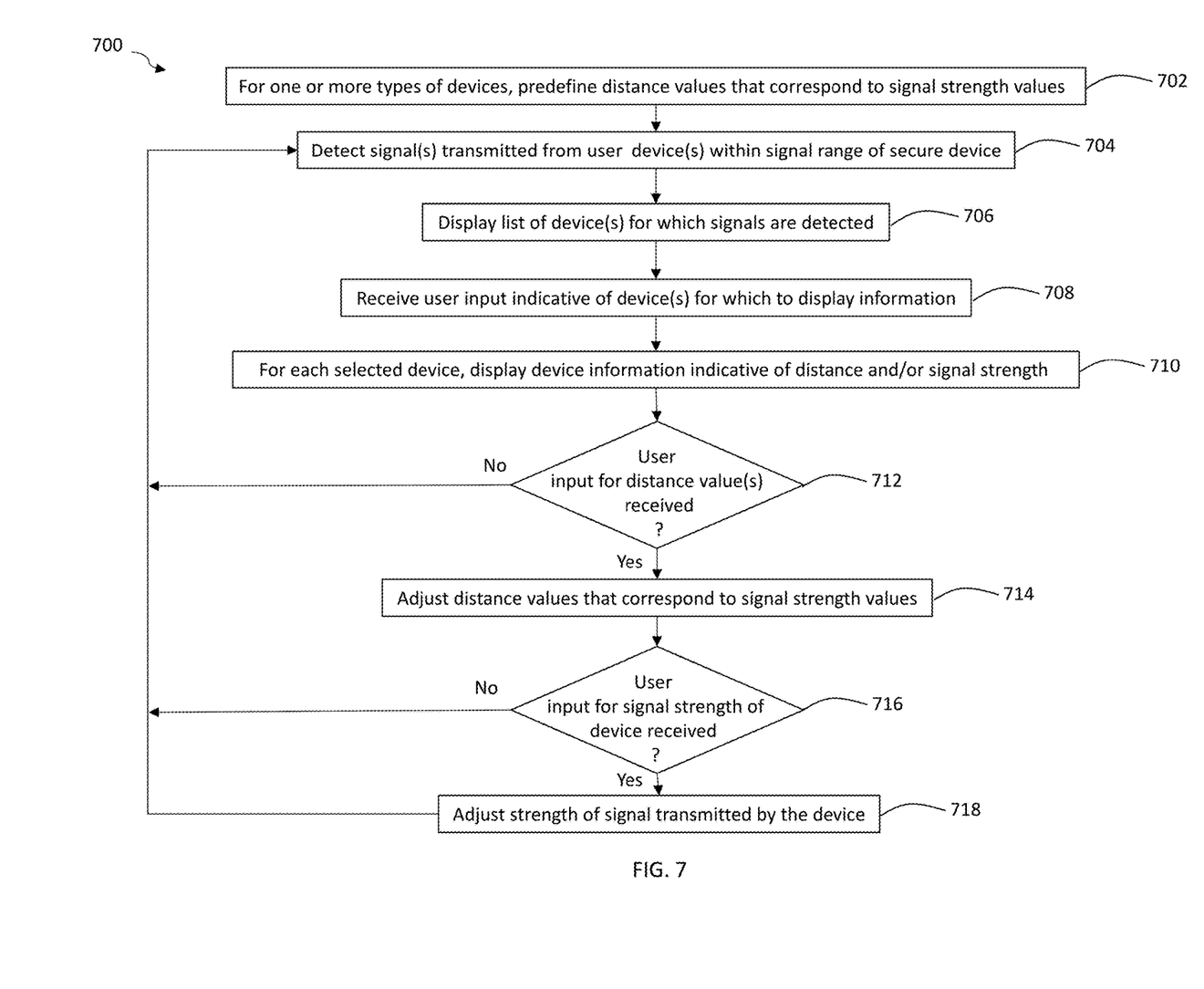
FIG. 7 is a flowchart illustrating graphically adjusting a signal strength range, according to embodiments of the system described herein.

FIG. 7 is a flowchart 700 illustrating an example of a method of graphically adjusting a signal strength range, according to embodiments of the system described herein. In a step 702, for one or more types of devices, distance values that correspond to signal strength values may be predefined, as described in more detail elsewhere herein. In a step 704, one or more signals transmitted from one or more user devices within signal range of secure device are detected by the secure device.

In a step 706, a list of one or more devices for which signals are detected is displayed, for example, in a drop down menu, as described in more detail elsewhere herein. In a step 708, user input indicative of the one or more device for which to display information is received, as described in more detail elsewhere herein. For example, one or more devices may be selected (e.g., checked) from a drop-down menu. In a step 710, for each selected device, device information indicative of distance and/or signal strength may be displayed, as described in more detail elsewhere herein.

In a step 712, it may be determined whether a user input for one or more distance values has been received, as described in more detail elsewhere herein. For example, it may be determined whether a user has entered a value to override a predetermined value being used for display of an estimated distance corresponding to a detected signal strength from the user device. If it is determined that such a user input has been received, then distance values corresponding to the detected signal strength values may be adjusted in a step 714, as described in more detail elsewhere herein, and the method may proceed to a step 716.

In the step 716, it may be determined whether a user input for a strength of signal transmitted for the user device has been received, as described in more detail elsewhere herein. For example, it may be determined whether a user moved a user device icon relative a display range icon. If it is determined that such a user input has been received, then a strength of signal transmitted by the device may be adjusted in a step 718, as described in more detail elsewhere herein. If the determination in either of the steps 712, 716 is negative (not true), the method may return to the step 704.

It should be appreciated that two or more steps (e.g., the step 712 and the step 716) of the method may be performed in a different order than illustrated and/or concurrently, at least in part. Further, the method presents an illustrative example in which steps are performed sequentially for illustrative purposes, but it should be appreciated that one or more steps may be performed in response to asynchronous acts, e.g., events. For example, at any point during the display of signal strength and/or distance information for a user device, user input may be received that changes one or more parameters affecting the signal strength and/or distance information, and the display of the signal strength and/or distance information may be adjusted accordingly. Further, the method illustrated by the flowchart 700 and/or portions thereof may be performed concurrently with the method or portions thereof illustrated by the flowchart 600, discussed above, in connection with the display and adjustment of information on a same GUI display, as described elsewhere herein.

Figure 8:
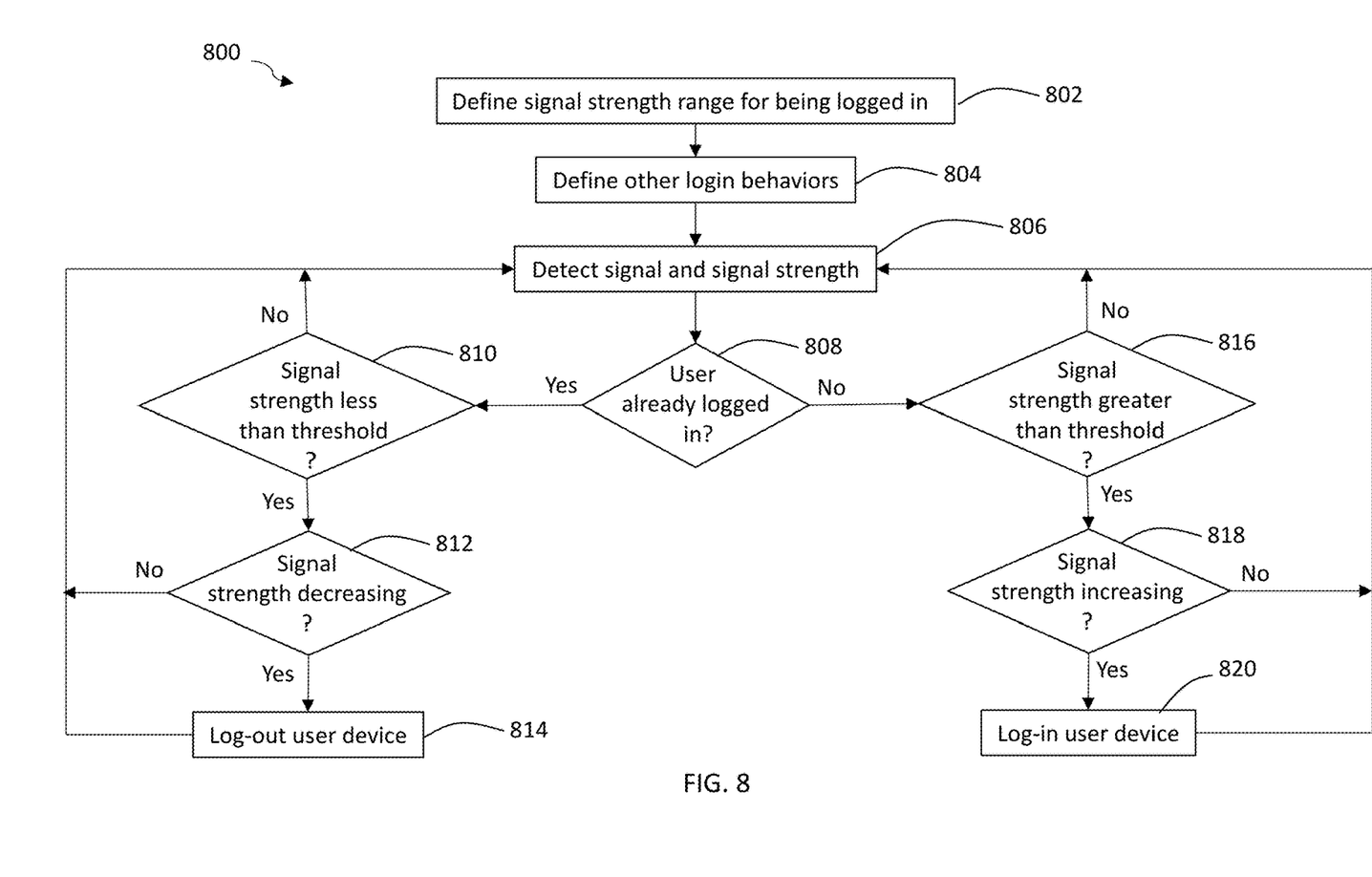
FIG. 8 is a flowchart illustrating controlling access to a device, according to embodiments of the system described herein.

FIG. 8 is a flowchart 800 illustrating controlling access to a device, according to embodiments of the system described herein. In a step 802 and a step 804, signal strength range and other log-in behaviors (e.g., in relation to whether user device is moving away or approaching the secure device) may be defined, as described in more detail elsewhere herein. In a step 806, a signal (e.g., a detection signal) and a strength of the signal may be detected. In a step 808 it may be determined whether a user is logged in. If the user in not logged in, then the method may proceed to a step 816, and if the user is logged in, then the method may proceed to a step 810.

In the step 816, it may be determined whether a signal strength is greater than a minimum signal strength threshold, for example, a minimum signal strength threshold defined using the user interface 200, and if the signal strength is greater, then in a step 818 it may be determined whether the signal strength has been increasing, which may indicate that the user device is getting closer to the secure device.

Detecting increasing signal strength may be determined by comparing a current detected signal strength value to one or more most recently detected signal strength values for the user device. If the signal strength is increasing, then the user device (and/or the user thereof) may be allowed to log into or unlock the secure device and/or an application residing thereon at a step 820. If the determination in either of the steps 816 or 818 is negative (not true), the user may not be logged in and the method may return to the step 806. Not logging in a user device to a secure device or application thereof if the signal is decreasing, even if the signal is strong enough, may prevent attempting to log in a user device to a secure device or application for which the user of the user device has already been presented the option (as the use device had previously already been close enough), but turned it down, thereby preventing the user from being repeatedly interrupted from previously declines logins. In some embodiments, it is not taken into consideration whether signal strength is increasing, and if it determined in the step 816 that the signal is strong enough, the method proceeds directly to the step 820 and the user device is allowed to log-in or unlock the secure device.

In a step 810, it may be determined whether a signal strength is less than the minimum signal strength threshold, and, if it the signal strength less, then in a step 812 it may be determined whether the signal strength has been decreasing, which may indicate that the user device is getting further from the secure device. Decreasing signal strength may be determined by comparing the current detected signal strength value to one or more most recently detected signal strength values for the user device. If the signal strength is decreasing, then the user device (and/or the user thereof) may be logged or locked out of the secure device and/or an application residing thereon at a step 814. If the determination in either of the step 810 or the step 812 is negative (not true), the user may not be logged out and the method may return to the step 806. Not logging out a user device from a secure device or application thereof if the signal is decreasing, even if the signal is not strong enough, may address a situation where a signal strength value is temporarily skewed. In some embodiments, it is not taken into consideration whether signal strength is decreasing, and if it determined in the step 810 that the signal is not strong enough, the method proceeds directly to the step 814 and the user device is logged-out and the secure device is locked from the user device.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

While the system described herein has been disclosed in connection with various embodiments, modifications thereon will be readily apparent to those skilled in the art. Accordingly, the spirit and scope of the invention is set forth in the following claims.

What is claimed is:

1. A method of controlling user access to a first device, comprising:
    displaying on a screen a distance range icon, the distance range icon having a width in a direction extending away from a position on the screen representing the first device, the width indicative of a range of distance from the first device, the range of distance corresponding to a signal strength range that is indicative of a range of signal strength of a signal received at the first device from another device for which to allow the another device to log-in to the first device or an application on the first device;
    for each of one or more second devices, displaying a device icon on the screen at a position relative to the distance range icon indicative of an estimated current distance of the second device from the first device;
    displaying on the screen, a distance range icon control configured for receiving user input indicative of a change to the range of distance;
    receiving a first user input, via the distance range icon control, indicative of a change to the range of distance corresponding to a change in the signal strength range;
    adjusting the width of the distance range icon based on the first user input; and
    controlling access of devices to the first device based on the signal strength range.

2. The method of claim 1, wherein the distance range icon control comprises a slider control, wherein a position of a slider on the slider control corresponds to a respective width of the distance range icon.

3. The method of claim 1, wherein distance range icon comprises a series of radio wave lines, the series of wave lines collectively making up the width of the distance range icon.

4. The method of claim 1, further comprising, for each of the one or more second devices:
    detecting a signal transmitted from the second device; and
    displaying a value indicative of a strength of the detected signal, wherein the position of the device icon for the second device relative to the distance range icon is determined from the strength of the detected signal.

5. The method of claim 1, further comprising:
    for each of a plurality of signal strength values in the signal strength range, determining, for each of one or more device types, a distance from the device type that corresponds to the signal strength value, wherein at least one of the one or more second devices is one of the device types for which a distance is determined; and
    for the at least one of the one or more second devices, determining an estimated current distance of the at least one of the one or more second devices from the first device based on the determined distance of the device type of the at least one second device.

6. The method of claim 1, further comprising:
    receiving a second user input indicating movement of the device icon of a first one of the one or more second devices; and
    in response to the second user input, moving the device icon of the first one of the one or more second device and adjusting a strength at which a signal is transmitted from the first one of the one or more second devices.

7. The method of claim 1, further comprising:
    detecting a plurality of devices transmitting signals for which a signal strength is within the signal strength range;
    displaying a control listing the plurality of detected devices; and
    in response to a second user input, selecting the one or more second devices from the list.

8. A method of controlling user access to a first device, comprising:
    displaying on a screen a distance range icon, the distance range icon having a width in a direction extending away from a position on the screen representing the first device, the width indicative of a range of distance from the first device;
    displaying a device icon on a screen relative to the distance range icon based on a correlation between a strength of a signal being received at the first device from a second device and a distance of the second device from the first device;
    displaying on the screen, a distance range icon control for receiving user input;
    receiving a first user input, via the distance range icon control, indicative of a desired range of signal strength of a signal received at the first device from another device for which to allow the other device to log-in to the first device or an application on the first device;
    defining a signal strength range based on the first user input and adjusting the width of the distance range icon based on the signal strength range;
    detecting, at the first device, a first signal from a third device;
    determining whether a first signal strength of the first signal is within the defined signal strength range; and
    based at least in part on the determination of whether the first signal strength is within the defined signal strength range, determining whether to log-in a user of the third device to at least one of the first device and an application on the first device.

9. The method of claim 8, wherein it is determined that the first signal strength is within the defined signal strength range, the method further comprising:
    determining whether the first signal strength is greater than a second signal strength of a second signal detected at the first device from the third device prior to detection of the first signal; and
    determining whether to log-in the user to the at least one of the first device and the application based at least in part on whether the first signal strength is greater than the second signal strength.

10. The method of claim 8, further comprising, after the user has been logged into the at least one of the first device and the application:
    detecting, at the first device, a second signal from the third device;
    determining whether a second signal strength of the second signal is outside the defined signal strength range; and
    based at least in part on determining whether the second signal strength is outside the defined signal strength range, determining whether to log-out the user from the at least one of the first device and the application.

11. The method of claim 10, wherein it is determined that the second signal strength is outside the defined signal strength range, the method further comprising:
- determining whether the second signal strength is greater than a third signal strength of a third signal detected at the first device from the third device prior to detection of the second signal; and
- determining whether to log-out the user from the at least one of the first device and the application based at least in part on whether the second signal strength is greater than the third signal strength.

12. The method of claim 8, wherein the distance range icon control comprises a slider control, wherein a position of a slider on the slider control corresponds to a respective width of the distance range icon.

13. A system for managing access control to a first device, comprising:
- a display screen; and
- at least one processor coupled to a memory, the memory storing processor executable instructions that configure the at least one processor to:
  - display on the display screen a distance range icon, the distance range icon having a width in a direction extending away from a position on the display screen representing the first device, the width indicative of a range of distance from the first device, the range corresponding to a signal strength range that is indicative of a range of signal strength of a signal received at the first device from another device for which to allow the another device to log-in to the first device or an application on the first device;
  - for each of one or more second devices, display a device icon on the display screen at a position relative to the distance range icon indicative of an estimated current distance of the second device from the first device;
  - display on the display screen, a distance range icon control configured for receiving user input indicative of a change to the range of distance;
  - receive a first user input, via the distance range icon control, indicative of a change to the range of distance corresponding to a change in the signal strength range; and
  - adjust the width of the distance range icon based on the first user input, wherein access of devices to the first device is controlled based on the signal strength range.

14. The system of claim 13, wherein the distance range icon control comprises a slider control, wherein a position of a slider on the slider control corresponds to a respective width of the distance range icon.

15. The system of claim 13, wherein the distance range icon comprises a series of radio wave lines, the series of wave lines collectively making up the width of the distance range icon.

16. The system of claim 13, wherein a display position of the device icon for a given one of the one or more second devices relative to the distance range icon is determined according to a strength of a detected signal from the given second device.

17. The system of claim 13, wherein the processor executable instructions configure the at least one processor to additionally:
- for each of a plurality of signal strength values in the signal strength range, determine, for each of one or more device types, a distance from the device type that corresponds to the signal strength value, wherein at least one of the one or more second devices is one of the device types for which a distance is determined; and
- for the at least one of the one or more second devices, determine an estimated current distance of the at least one of the one or more second devices from the first device based on the determined distance of the device type of the at least one second device.

18. The system of claim 13, wherein the processor executable instructions configure the at least one processor to additionally:
- receive a second user input indicating movement of the device icon of a first one of the one or more second devices; and
- in response to the second user input, move the device icon of the first one of the one or more second devices and adjust a strength at which a signal is transmitted from the first one of the one or more second devices.

19. The system of claim 13, wherein the processor executable instructions configure the at least one processor to additionally:
- detect a plurality of devices transmitting signals for which a signal strength is within the signal strength range;
- display a control listing the plurality of detected device; and
- in response to a second user input, select the one or more second devices from the list.

* * * * *